United States Patent [19]
Barber, Jr. et al.

[11] Patent Number: 5,365,332
[45] Date of Patent: Nov. 15, 1994

[54] FIREARM INSPECTION DEVICE

[75] Inventors: John C. Barber, Jr.; Janet L. Barber; John S. A. Barber, all of Friendship, Wis.

[73] Assignee: J. Bar Enterprises, Friendship, Wis.

[21] Appl. No.: 19,042

[22] Filed: Feb. 18, 1993

[51] Int. Cl.$^5$ .................................. G02B 23/26
[52] U.S. Cl. ........................... 356/241; 385/117
[58] Field of Search ............. 356/241; 385/117, 116, 385/902

[56] References Cited

U.S. PATENT DOCUMENTS

| | | | |
|---|---|---|---|
| 2,403,452 | 7/1946 | Novak | 356/341 |
| 3,228,108 | 1/1966 | Chaperon | 33/234 |
| 3,582,638 | 6/1971 | Peters | 362/32 |
| 3,837,748 | 9/1974 | Wada | 401/30 |
| 4,339,200 | 7/1982 | Corbin | 356/341 |

Primary Examiner—Rolf Hille
Assistant Examiner—Alexander Oscar Williams

[57] ABSTRACT

A device for inspecting a firearm by directing light from an exterior source to the bore or barrel of the firearm includes a generally L-shaped, single piece, light-transmitting member having a first leg substantially cylindrical in cross section merging smoothly into a second outwardly flaring leg substantially non-cylindrical in cross section. The first leg and second leg each have convexly-shaped free ends and cooperate to increase the gathering, capture and distribution of light between the source and the bore of the firearm.

6 Claims, 1 Drawing Sheet

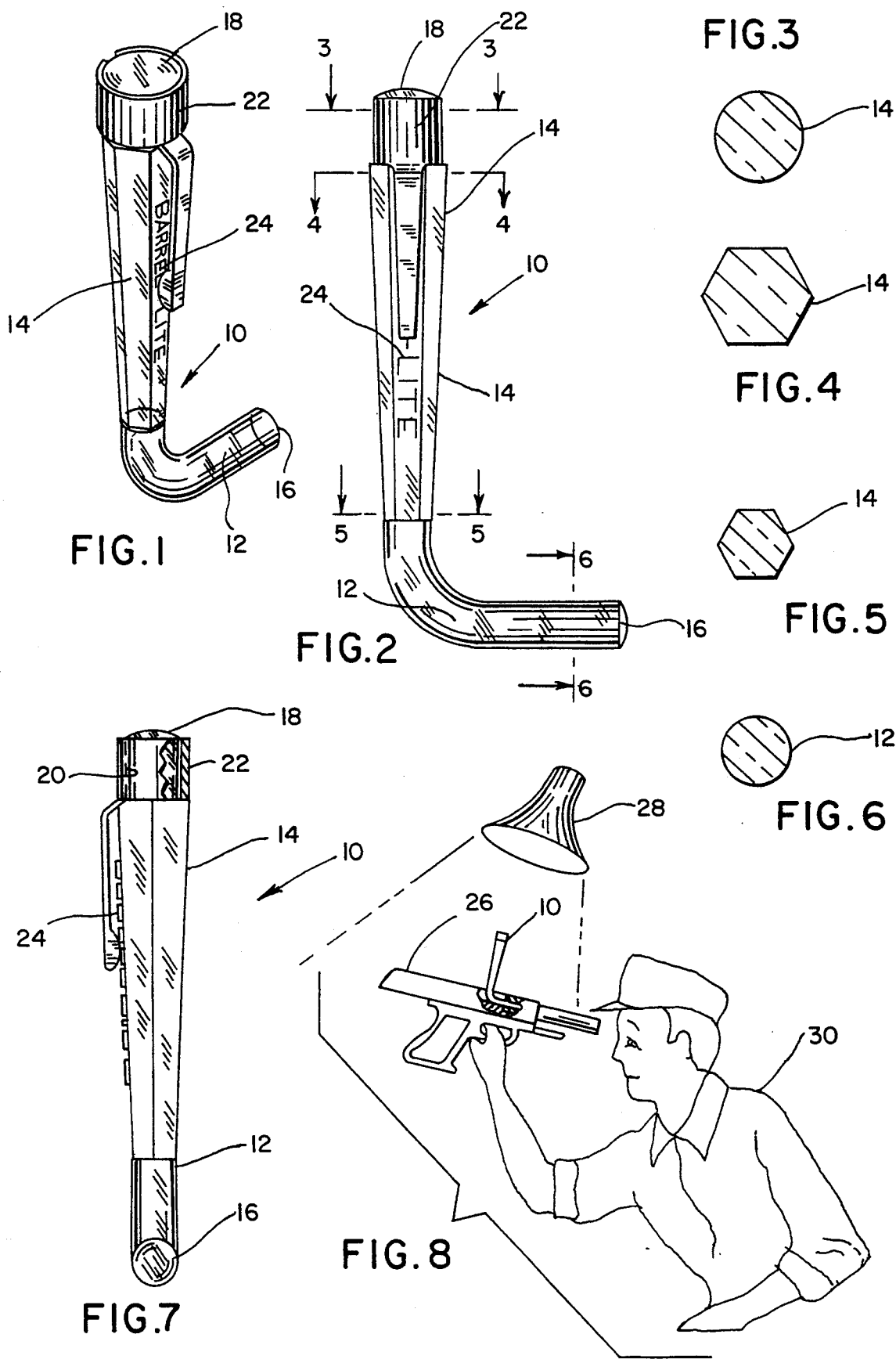

FIREARM INSPECTION DEVICE

TECHNICAL FIELD

The present invention relates generally to devices utilized in the inspection of bores and barrels of pistols, shotguns, rifles and other firearms and, more particularly, pertains to an illumination aid used to detect rust, pits, leading and other rifling problems in the elongated discharge chamber of a powder-actuated weapon.

BACKGROUND OF THE INVENTION

Devices using reflective light for examining the interior condition of a gun bore or barrel for wear, obstruction and other defects are well known. In general, such devices when placed in the receiving chamber of a firearm operate to transmit or refract light from an external source into the bore or barrel of a firearm and permit inspection from the muzzle end thereof. Over the years, sundry designs have evolved which employ various assemblies and materials to attain this common objective.

For example, one such device is disclosed in U.S. Pat. No. 2,403,452 issued Jul. 9, 1946 to Novak. In this arrangement, a bent piece of constant diameter, cylindrical, thermoplastic material is embedded in a block of metal held in the breech of gun. A related device is set forth in U.S. Pat. No. 3,228,108 issued Jan. 11, 1966 to Chaperon. Here, a combination bore sight and scope features a generally L-shaped, transparent material provided with a fused mirror. While devices of this type are generally satisfactory in accomplishing their basic goal, there remains a need to improve firearm inspection devices so that they will provide a better inspection quality, be more easily manufactured and be more positively handled, yet remain lightweight, durable and inexpensive.

Unlike prior art constructions which employed manually formed or bent Lucite or acrylic pipe, it would be preferable to seek a quality injection molded product utilizing a flowable material which has extremely high ultraviolet radiation absorption and a high refractive index to improve the transmission of light captured from an external source. In the same vein, it would be desirable to obtain a configuration which will optimize light gathering and distribution. It is further contemplated that, in the environment of firearm maintenance, gun powder and other surface residues could make the inspection device more difficult to handle so that provision should be made to enable a more positive handling of the inspection device. Moreover, the inspection device should remain simplistic in construction and use without dependency on batteries, switches, bulbs, wires and the like which compound the manufacturing and maintenance costs of some designs heretofore used.

SUMMARY OF THE INVENTION

The present invention advantageously provides an improved operative quality for firearm inspection devices. The enhanced instrument is particularly versatile and can be used with a variety of gun calibers.

These and other advantages are realized in one aspect of the invention by a device for inspecting a firearm by directing light from an exterior source to the bore of a firearm and including a first leg substantially circular in cross section merging smoothly into a second outwardly flaring leg substantially non-circular in cross section. Each of the first and second legs have convexly-shaped free ends, the free end of the second leg being larger in diameter than the free end of the first leg. The first and second legs and their respective free ends are so constructed to increase the gathering, capture and distribution of light between the source and the bore of the firearm.

In a highly preferred embodiment, the invention contemplates a material construction of transparent Plexiglas formed with raised indicia on the external surface of the second leg which is preferably hexagonal in cross section. The second leg is also recessed at its free end to define a seat for a rotatable pocket clip.

BRIEF DESCRIPTION OF THE DRAWING

The invention will be better understood by referring to the following detailed description of the preferred exemplary embodiment when read in conjunction with the appended drawing wherein like numerals denote like elements and:

FIG. 1 is a perspective view of a firearm inspection device employing the present invention;

FIG. 2 is a plan view of the device shown in FIG. 1;

FIG. 3 is a cross sectional view taken on line 3—3 of FIG. 2;

FIG. 4 is a cross sectional view taken on line 4—4 of FIG. 2;

FIG. 5 is a cross sectional view taken on line 5—5 of FIG. 2;

FIG. 6 is a cross sectional view taken on line 6—6 of FIG. 2;

FIG. 7 is a plan view of the device shown in FIG. 2 rotated 90 degrees; and

FIG. 8 is a view of the inspection device applied to a gun bore for proper and satisfactory inspection thereof.

DETAILED DESCRIPTION OF THE PREFERRED EMBODIMENT

Referring to FIG. 1., a firearm inspection device 10 embodying the present invention is employed in the examination and ambient illumination of various caliber guns to determine the interior condition of a bore or barrel. Device 10 is generally L-shaped and suitably comprises a single piece or integral, light-transmitting member preferably formed from a flowable resin exhibiting superior durability and a high refractive index(1.49). In the embodiment shown, device 10 is injection molded from transparent or colorless Plexiglas VS (grade 6) which flows at 270 degrees F and possesses unusually high ultraviolet radiation absorption properties to maximize light transmitting capability when used as a light conveyance.

Device 10 includes a first leg 12 having a generally circular cross section with a constant diameter throughout its length. Leg 12 merges smoothly and integrally into a second leg 14 which diverges or flows outwardly and has a substantially non-circular preferably hexagonal cross section. Each of legs 12,14 is provided with a convexly-shaped outwardly curved, polished free end 16,18 respectively, which functions as an optical sight at each end of device 10, free end 18 having a larger diameter than free end 16. A small portion 20(FIG. 7) of free end 18 is recessed into a cylindrical cross section to define a seat for a rotatable pocket clip 22 retained by a friction fit or the like. The exterior surface of leg 14 is formed with raised or outwardly projecting indicia 24 representing the product trademark BARREL-LITE or any other information as desired.

In use, depending on the caliber of the gun, free end 16 is inserted into or against the receiving chamber or reducing cone of a firearm 26 (FIG. 8). The other free end 18 is then pointed towards an exterior, ambient light source 28 such as a lamp, campfire, flashlight, sun or the like. Light energy is thus gathered at free end 18 and captively transmitted through device 10 for diffusion from free end 16 into the interior of firearm 26 so that an inspector 30 uses the naked eye to view through the muzzle end of firearm 26 to peruse the illuminated bore or barrel. For shotguns and larger caliber rifles, free end 18 is positioned alternatively in or against the receiving chamber of firearm 26.

It should be appreciated that due to the combined outwardly flaring configuration of leg 14 and the convexly-shaped free ends 16, 18, it has been found that light energy is more efficiently gathered, captured and distributed into the bore or barrel of a firearm. It should be further understood that the hexagonal shape and raised indicia 24 on leg 14 defines a grip enhancing surface which minimizes fumbling or slippage in the presence of powder-like residues on firearm 26. Rotatable pocket clip 22 allows device 10 to be easily transported in and accessed from the shirt pocket of a user 30.

While the invention has been described with reference to a preferred embodiment, those skilled in art will further appreciate that certain substitutions, alterations and omissions may be made without departing from the spirit thereof. For example, in the preferred form of the invention, the outside diameter of the legs 14, 16 may range from ⅛" to 3" while the length may vary from 1.5" to 12". In addition, different colored materials and methods of manufacture may be utilized. For example, light-transmitting member 10 may be tinted red to provide a like-colored illumination. Also, an acrylic such as Lucite may be manually bent to form a similar product. Accordingly, the foregoing description is meant to be exemplary only, and should not be deemed limitative on the scope of the invention set forth in the following claims.

We claim:

1. A device for inspecting a firearm by directing light from a remote, exterior source to the receiving chamber and bore of a firearm, said device comprising:

a compact, generally L-shaped, single piece, completely transparent, light-transmitting, molded, mirror-free member including a first leg substantially circular in cross section with a constant diameter throughout its length and having an outwardly curved, unobstructed free end, said first leg merging smoothly into a second leg substantially polygonal in cross section with an outwardly flaring diameter throughout its length and having an outwardly curved, unobstructed free end larger in diameter than said free end of said first leg, each of said free ends forming a convex lens used as an optical sight, either of said free ends being insertable in said receiving chamber while the other of said free ends is exposable to the light from said exterior source, such that the light is gathered and diffused via said free ends into said bore for substantially unobstructed, inspection thereof.

2. The device of claim 1, wherein said member is comprised of a Plexiglas resin.

3. The device of claim 1, wherein said free end of said second leg is provided with a rotatable pocket clip.

4. The device of claim 1, wherein said second leg is hexagonal in cross section to form a grip enhancing surface.

5. The device of claim 4, wherein said second leg is formed with raised indicia to further supplement said grip enhancing surface.

6. The device of claim 1, wherein said member is colorless.

* * * * *